United States Patent [19]
Winzen

[11] 3,912,632
[45] Oct. 14, 1975

[54] FILTER DEVICE

[75] Inventor: John P. Winzen, Palos Verdes Estates, Calif.

[73] Assignee: Brunswick Corporation, Skokie, Ill.

[22] Filed: May 10, 1972

[21] Appl. No.: 252,103

Related U.S. Application Data

[63] Continuation of Ser. No. 28,307, April 14, 1970, abandoned.

[52] U.S. Cl. ............... 210/137; 210/138; 210/387; 55/352
[51] Int. Cl. ............................................ B01d 29/02
[58] Field of Search ....... 210/97, 137, 387, 90, 103, 210/108, 138; 55/352, 354

[56] References Cited
UNITED STATES PATENTS

| | | | |
|---|---|---|---|
| 2,848,064 | 8/1958 | Gregory et al. | 55/352 X |
| 3,175,775 | 3/1965 | Wurtenberg et al. | 55/354 X |
| 3,332,215 | 7/1967 | Revelle | 55/352 X |
| 3,379,206 | 4/1968 | Whiting | 210/90 X |
| 3,465,707 | 9/1969 | Kashiwaba | 210/90 X |
| 3,552,098 | 1/1971 | Cochran | 55/322 X |

Primary Examiner—John Adee
Attorney, Agent, or Firm—John G. Heimovics

[57] ABSTRACT

The invention relates to a continuous and controlled filter device that filters gases and liquids while maintaining a low differential pressure across the filter element. The device automatically advances clean filter medium into the filter seat or window when the differential pressure rises to a predetermined level replacing dirty filter medium with clean filter medium.

4 Claims, 8 Drawing Figures

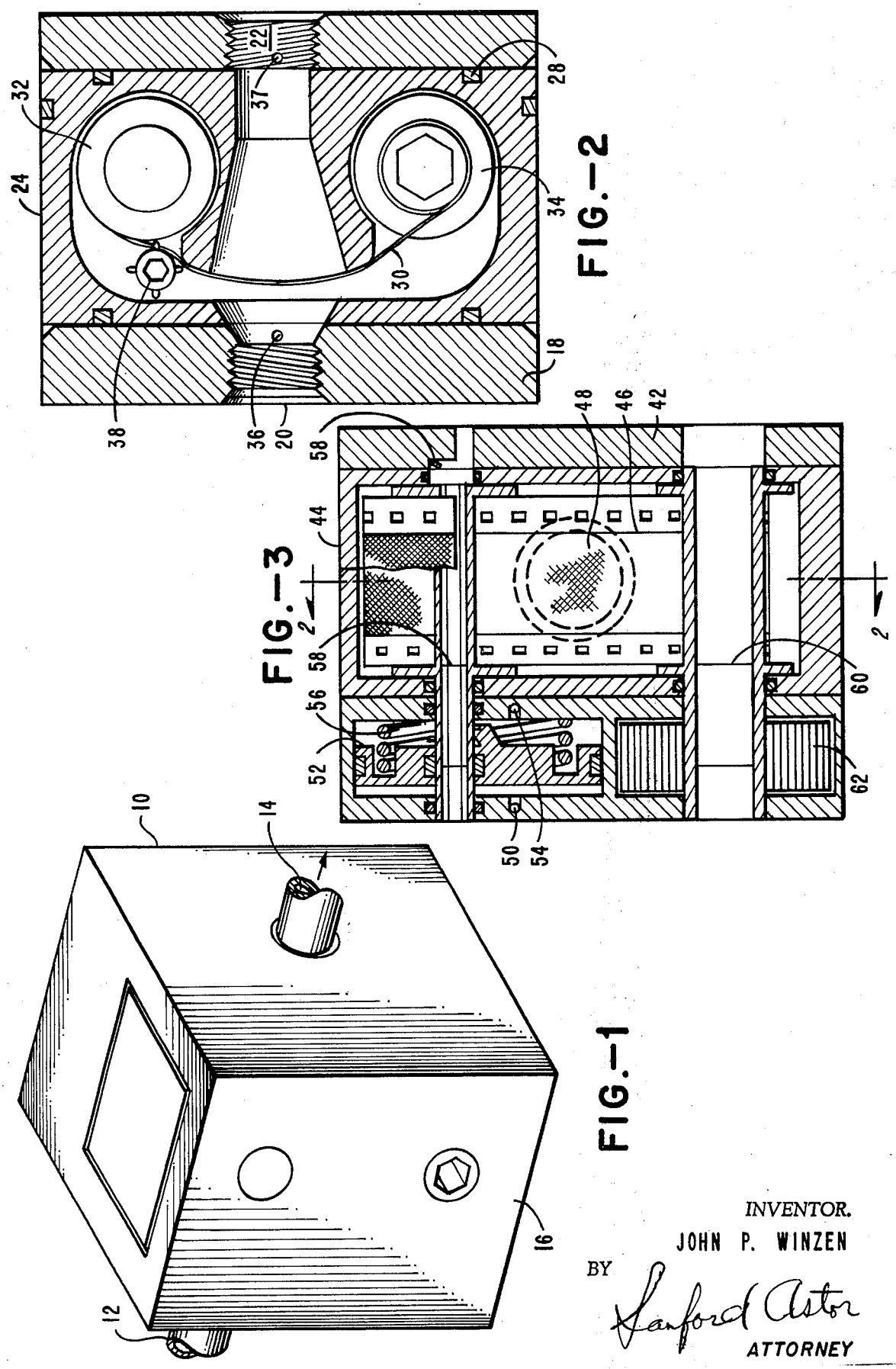

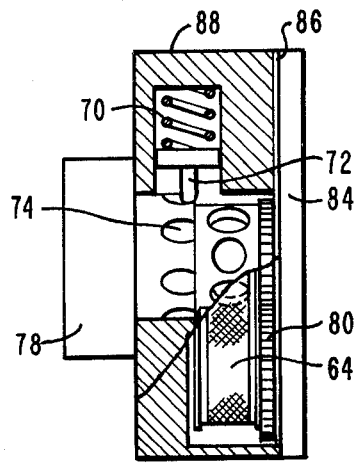
FIG.—4
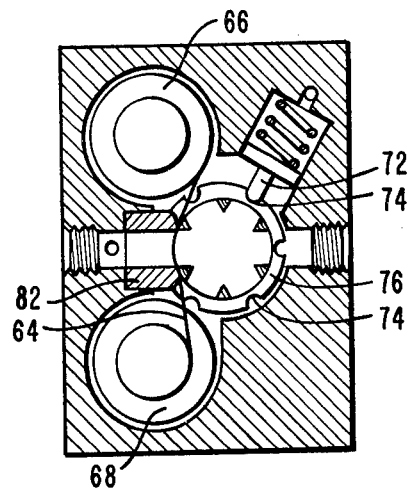
FIG.—5
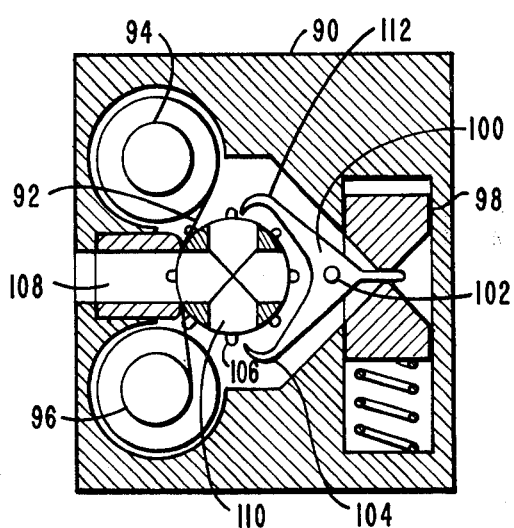
FIG.—6
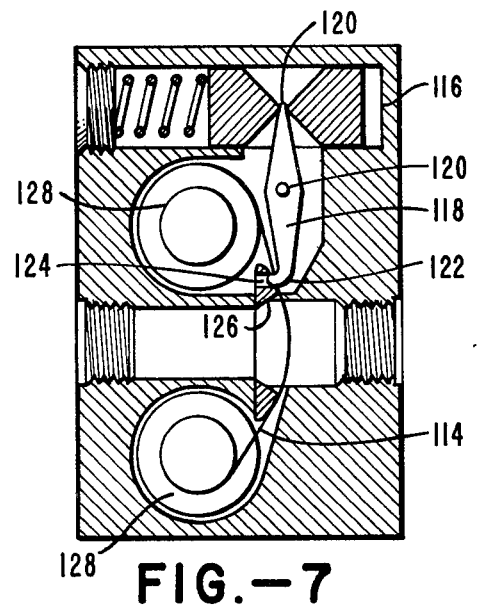
FIG.—7

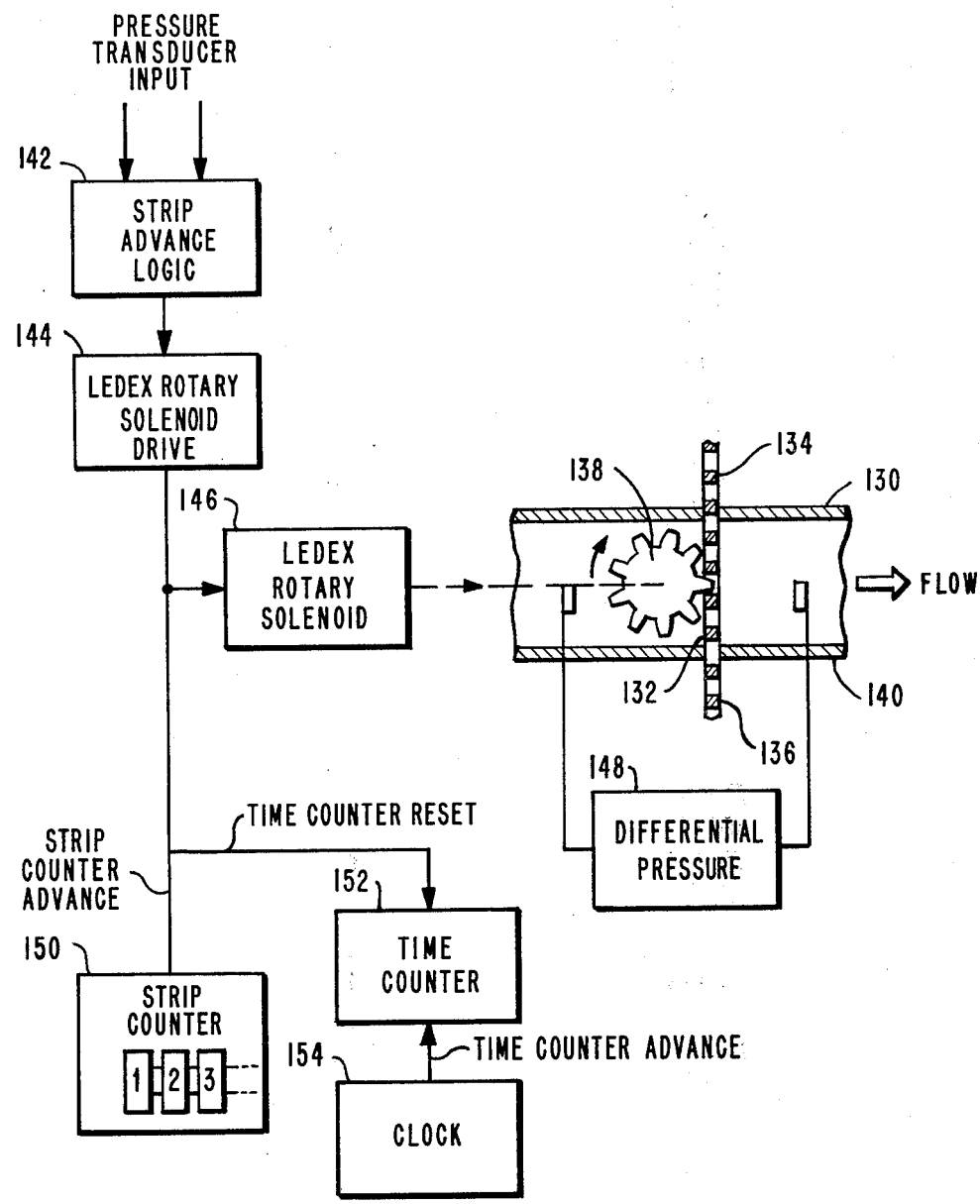

FILTER DEVICE

The invention described herein was made in the performance of work under NASA Contract No. NAS 9-11 264 and is subject to the provisions of Section 305 of the National Aeronautics and Space Act of 1958 (72 STAT. 435: 42 USC2457).

This is a continuation, of application Ser. No. 28,307, filed Apr. 14, 1970, now abandoned.

There are many systems, particularly those used in aerospace fluid power applications, such as propellant feed systems, wherein the operating cycles, pressure supplies or fluid volumes are either fixed or otherwise limited. This makes it mandatory that the pressure drop caused by a filter be controlled in terms of degree and rate of increase in order to prevent flow decay and to maintain proper system pressure, mixture ratios and response times.

This degree and rate at which the differential pressure of a filter of specific filtration efficiency increases during a typical operational cycle of a given system, however, is affected by a number of constantly changing conditions. These conditions are the amount of entrained contaminants, the rate of contaminant generation, the size of the particles generated and the physical and chemical composition of the contaminants. In addition, the differential pressure build-up of the filter varies as a function of a number of other conditions or combinations thereof. These functions are the type of system, the type of fluid medium, the flow rate, system pressure, total fluid flow, pressure and flow surges, vibration and other environmental conditions during the complete operational cycle.

Even when a filter is properly sized, however, the present methods or configurations provide no means of determining how much of the useful service life of the filter has been expended at any point during its period of operation, nor do they provide any warning of the approaching end of the service life cycle. This is due to the fact that the initial pressure loss caused by the filter at rated flow is almost entirely due to its port connections and other restrictions within the filter housing. Thus, the pressure drop of the filter does not increase significantly until most of its service life has been expended. As soon as the increase does become measurable, however, it rises asymtotically until it reaches the systems operating pressure. This high pressure, inturn, makes it necessary to provide supporting structures on the downstream side of the filtering element to prevent its collapse at the maximum transient pressures of the system. The supporting structure further increases the size and weight of the filter assembly.

In addition, the uncontrolled build-up of differential pressure across the filter element causes trapped particles to be forced deeper into the filter medium capillaries and makes it difficult to reclean such units after usage. It is common practice to clean or replace the filter element at periodic overhaul periods and as a result most filters in use are replaced or recleaned far too frequently which adds unnecessary operational costs.

Another problem area associated with the present methods and configurations is caused by the fact that as the filter removes contaminants from the fluid, the mean pore size of the filtering medium gets smaller due to partial or complete blockage of the capillaries. This results in the retention of contaminants from the fluid which are smaller than the filter is initially designed to remove to protect the system. This retention of smaller particles, in turn, accelerates the rate of differential pressure build-up towards the end of the filter's service life.

It is an object of this invention to provide a continuous and controlled filtration of fluids.

Another object of this invention is to provide filtration of fluids while maintaining a relatively constant low differential pressure over a long period of filtration time.

Another object of this invention is to control filtration efficiency throughout the system service life.

Another object of this invention is to eliminate the contamination of the fluid system which is introduced during the replacement of fixed size filters of filter elements.

Another object of this invention is to provide a continuous visible indication of the amount of filter service life used or remaining, and of trends or changes in the gravimetric contaminant level of the system fluid.

Another object of this invention is to provide built-in feedback information for remote data acquisition of used and remaining filter service life and contaminant level trends within the system.

Another of the objects of this invention is to measure and record the amount of water in liquids. The rate of change and increase in differential pressure across a porous material, with known water absorption, will provide quantitative values and indicate trends of moisture in liquids.

Another of the objects of this invention is to measure and control the humidity of a chamber, cell or room. The atmosphere of the chamber would be sampled through the invention. The change in the differential pressure across the moisture absorbing porous material will, in conjunction with a control system, result in the adjustment of the humidity in the chamber.

Some of the objects of the invention having been stated other objects and features will become apparent from the following accompanying drawings in which:

FIG. 1 is an overall perspective view of the device of the present invention.

FIG. 2 is a cross sectional view taken of a device of the present invention.

FIG. 3 is a cross sectional view of a device of the present invention.

FIG. 4 is a side elevation partially broken away of a device of the present invention.

FIG. 5 is a side elevation partially broken away of a device of the present invention.

FIG. 6 is a side elevation partially broken away of a device of the present invention.

FIG. 7 is a side elevation partially broken away of a device of the present invention.

FIG. 8 is a diagrammatic arrangement of an electrically controlled device of the present invention.

Referring now to FIG. 1. there is shown the case 10 housing the device of the present invention. As inlet line 12 and exit line 14 allow the fluid stream to be filtered to pass into and out of the filter device of this invention. A cartridge assembly 16 fits into the case assembly 10 of the present invention. This cartridge assembly may be easily slipped into place and out of place when replacement is necessary.

Referring now to FIG. 2, there is shown a spring motor powered concept of this invention. However, it is pointed out that electrical, hydraulic or pneumatic motors may be used in lieu of the spring motor shown.

There is shown the case assembly 18 having an inlet port 20 and an outlet port 22 into which is placed a closely fitting cartridge assembly 24. Cartridge assembly 24 is fluidically sealed to case assembly 18 by seals 26 and 28, and is mechanically secured in place by a shaft coupling shown in FIG. 3.

The system fluid enters inlet port 20 and is filtered by the strip filter element 30 and then passes through outlet port 22. Strip filter 30 is wound on supply spool 32 and moves to take-up spool 34.

As the fluid system contaminants collect on the strip filter element 30 the differential pressure across the filter element increases. A pressure sensing line 36 is routed from the upstream side of the filter element to one side of the differential pressure sensor shown hereafter in FIG. 3. Another pressure sensing line 37 is routed from the downstream side of the filter element to the other side of the differential pressure sensor. When the differential pressure across the filter element 30 reaches a predetermined value the higher pressure overbalances the differential pressure sensor and causes is to move inboard. The inboard motion of the sensor disengages a stop from a pin in the advancement control shaft 38. The motion can be inboard or outboard depending on the orientation of the sensor and advancement control pins.

When the stop is no longer engaged the drive mechanism shown in FIG. 3. permits the take-up spool 34 to rotate. The rotation of the take-up spool 34 winds up the dirty filter element 30 onto the take-up spool 34. This action starts the movement of clean filter strip across the filter seat window 40 and causes the differential pressure across the filter to drop. As the differential pressure across the filter seat window 40 decreases the pressure sensor moves outboard. The outboard motion of the sensor moves a stop into position to engage with the next pin in the advancement control 38. The pins in the advancement control 38 are located in a manner to permit the movement of clean filter strip across the entire filter seat window before the next pin is engaged with the stop.

Referring now to FIG. 3. there is shown the case assembly 42 and the cartridge assembly 44 showing filter strip 46 having filter seat window 48. Pressure sensing line 50 is routed from the upstream side of the filter element to one side of the differential pressure sensor 52. Another pressure sensing line 54 is routed from the downstream side of the filter element to the statically loaded side of the differential pressure sensor 52.

The differential pressure sensor 52 is a balanced pressure device made of a balance piston with ring seals, a pilot valve with close fits utilizing spring 56. These types of pressure sensing devices are common in the art and other well-known types may also be used such as a bellows type with no seals or springs, or a diaphram type of single or bimetallic laminates. The type of balance pressure device is governed by the type of media being filtered.

A clutch 58 or a spring drag device is attached to the supply spool 32 as shown in FIG. 2., in order to keep filter element 46 under tension and in intimate contact with the filter seat 40 when the filter strip 30 is in motion. When the filter strip 46 has been used up the cartridge assembly 44 may be replaced with a new one by retracting coupling 58 and 60 from the shaft of the supply spool 32, and the take-up spool 34. A new cartridge assembly is placed on top and in line with the used cartridge assembly 44. Coupling 58 is retracted from the shaft of the supply spool 32 and a new cartridge is pushed down until it is flush with the top of the case assembly 42. Couplings 58 and 60 are then engaged with the shafts of the supply and take-up spools. Before engaging coupling 60 with the shaft of the take-up spool 34 the drive mechanism 62 is adjusted to its full operating positions then coupling 60 is engaged with the shaft of the take-up spool 34.

A supply indicator may be plugged into coupling 60 or the shaft in the take-up spool 34. The supply indicator gives a continuous indication of the amount of unused strip filter 30 which is left on supply spool 32. An elapsed time indicator which indicates the calendar time that the cartridge assembly has been in service may also be plugged into the coupling 60 or the shaft in the take-up spool 34.

The drive mechanism 62 shown is a spring, however, electrical, hydraulic or pneumatic motors may be used in lieu of a spring motor.

The strip filter medium is any of a well-known variety of filter mediums such as those described in U.S. Pat. No. 3,426,910 issued to John P. Winzen.

Referring to FIGS. 4 and 5 there is shown a noncartridge variation of the present invention. In this concept the strip filter 64, supply spool 66 and take-up spool 68 only are removed and replaced. The principle of operation is similar to that shown in FIG. 1, 2 and 3 except that when the differential pressure across the filter element exceeds a predetermined value the differential pressure sensor 70 withdraws the advancement control pin 72 from the indent cavity 74 in the sprocket 76. The drive mechanism 78 rotates the sprocket 76 and gears 80. The sprocket 76 draws clean filter strip across the filter seat window 82 and the gears rotate the take-up spool 68 winding up the dirty filter element. Small pins in each side of the sprocket 76 move and guide the filter strip 64. When clean filter covers the window in the filter seat 82 the differential pressure across the filter strip reduces causing differential pressure sensor 70 to engage the advancement control pin 72 with the indent cavity 74 in sprocket 76.

The drive mechanism 78 may be located internally or externally as a plug-in unit. Slip clutches are used on both the supply spool 66 and the take-up spool 68 to maintain tension on the filter strip 64. When the filter strip 64 has been used up, it may be replaced with new filter by shutting off the system fluid flow and removing cover plate 84. The old filter strip 64, supply spool 66 and take-up spool 68 are removed. The drive mechanism 78 is adjusted to full operating position. A new filter strip supply spool and take-up spool are inserted and the advancement control pin is engaged in the strip filter and indent holes in the sprocket 76. The cover plate 84 is replaced. A seal 86 is located between cover plate 84 and the case assembly 88 to prevent leakage at this interface.

Referring now to FIG. 6. there is shown an escapement mechanism for controlling the advancement of the strip filter. This mechanism is an alternate control to the one shown in FIGS. 4 and 5. There is shown the case assembly 90, the strip filter 92 and supply spools 94 and take-up 96. When the differential pressure across the filter strip 92 exceeds a predetermined value the differential pressure sensor 98 rotates the escapement 100 around a pivot 102 disengaging the stop 104 from sprocket pin 106. The drive mechanism, which is engaged with a take-up spool 96 rotates the take-up spool and winds dirty filter onto the spool. This action draws clean filter across the filter seat window 108 and rotates the sprocket 110. The rotation of sprocket 110 causes a sprocket pin to deflect the other prong 112 of the escapement 100 rotating escapement 100. This rotation brings the stop prong 104 of the escapement into contact with the next sprocket pin stopping the advancement of the strip filter 92. The filter element and sprocket remain in this position until the differential pressure across the filter elements causes the escapement to rotate again.

Referring now to FIG. 7. there is shown a pawl mechanism for controlling the advancement of the strip filter. When the differential pressure across the filter element 114 exceeds a predetermined value the differential pressure sensor 116 rotates an advancement control 118 about a pivot 120 causing the pawl 122 to disengage from the detent 124 in the filter seat 126 and the slots in the strip filter 114. The drive mechanism rotates the take-up spool 128 winding up the dirty filter and drawing clean strip across the window in the filter seat. When clean filter has covered the window of the filter seat the differential pressure is reduced causing the differential pressure sensor 116 to rotate the advancement control 118 and compel the pawls to engage the slots in the strip filter and detent hole 124 in the filter seat. The engagement of the pawl 122 in the strip filter stops the motion of the strip filter and places the strip filter under tension on the filter seat.

FIG. 8 shows a diagram of an electrically controlled embodiment of the invention showing a cut away portion of the case assembly 130 in which filter strip 132 with ends 134 leading from the supply spool and 136 leading to the take-up spool. Filter strip 132 is advanced by advancement control 138. The differential pressure sensor 148 is a pressure sensing electrical bridge type transducer. As the differential pressure across the filter element increases, the bridge circuit of the pressure transducer supplies an increasing voltage to the strip advance logic circuit 142. When the bridge circuit voltage reaches a predetermined level strip advance logic circuit 142 makes a decision to advance the strip filter.

At this time the power transistors of the Ledex Rotary Solenoid Drive 144 are energized to supply enough power to put the Ledex Rotary Solenoid 146 into motion. The solenoid activates a linkage which in turn rotates a ratchet and moves clean filter 132 across the window of the filter seat.

The differential pressure is then reduced and the output voltage from the differential pressure transducer drops. The drop in voltage from the bridge circuit to the strip advance logic circuit 142 causes this circuit to decide that no further movement of the strip filter is required and deactivates the rotary solenoid system. Feedback from the bridge type transducer or the strip advance logic circuit can be transmitted to a remote location for computer analysis or interpretation of performance data.

A strip counter advance circuit having a strip counter 150 or a time counter advance circuit having a time counter 152 and clock 154 may be utilized to give additional information as to the performace of the system.

Having fully described the invention and its utilities, it is desired that the invention be limited only by the scope of the appended claims.

I claim

1. A filter device comprising:
   a strip filter medium having a perforated edge thereon;
   a take-up spool for holding used strip filter medium;
   a pressure sensing electrical bridge disposed to measure differential pressure across the strip filter medium;
   a logic circuit for reading the differential pressure;
   drive menas directly connected to the perforated edge of the strip filter medium for moving said medium from said supply spool to said take-up spool; and,
   means interconnecting said logic circuit to said drive means for energizing said drive means for automatically moving the medium when the differential pressure read by said logic circuit is above a predetermined level and means for de-energizing said drive means when the differential pressure read by said logic circuit is reduced to below the predetermined level.

2. a filter device comprising:
   a filter strip medium having continuous edge indentations;
   a differential pressure sensor disposed to measure the differential pressure across said filter strip medium, and
   advancement means operably associated with said differential pressure sensor for advancing said filter strip medium until the differential pressure is reduced to a predetermined level,
   said advancement means including:
   a gear engaging said medium and having prongs thereon that mate with the indentations on said medium;
   a drive mechanism to rotate said gear, and
   means associated with said differential pressure sensor for moving into and out of the engagement with said indentations to permit said drive mechanism to rotate said gear on disengagement of said means from said indentations.

3. A filter device comprising
   a filter strip medium mounted on a supply spool and take-up spool,
   a differential pressure sensor disposed to measure the differential pressure across said filter strip medium, and
   advancement means operably associated with said differential pressure sensor for advancing said filter strip medium until the differential pressure is reduced to a predetermined level,
   wherein said advancement means includes
   a drive mechanism for driving said take-up spool;
   a gear having sprocket pins mounted thereon for engaging said filter strip medium, and
   an escapement mounted for pivotal movement into and out of engagement with said sprocket pins in response to movement of said differential pressure sensor.

4. A device for detecting the rate of change of contaminant levels on a movable filter strip medium comprising:
   a filter strip medium located in the stream of a fluid containing contaminants,
   a supply spool for holding a roll of said filter strip medium,
   a take-up spool for holding used filter strip medium, means for measuring the increase of the differential pressure across said filter strip medium, caused by contaminants filtered from the fluid, means operably associated with said measuring means and in direct contact with said medium for moving said medium from said supply spool to said take-up spool when the differential pressure is increased above a predetermined level, and means for timing the intervals between movements of said filter strip medium for detecting the rate of change of the contaminant level in said fluid.

* * * * *